B. A. BEHREND.
DYNAMO ELECTRIC MACHINE.
APPLICATION FILED JUNE 5, 1905.
922,839.
Patented May 25, 1909.
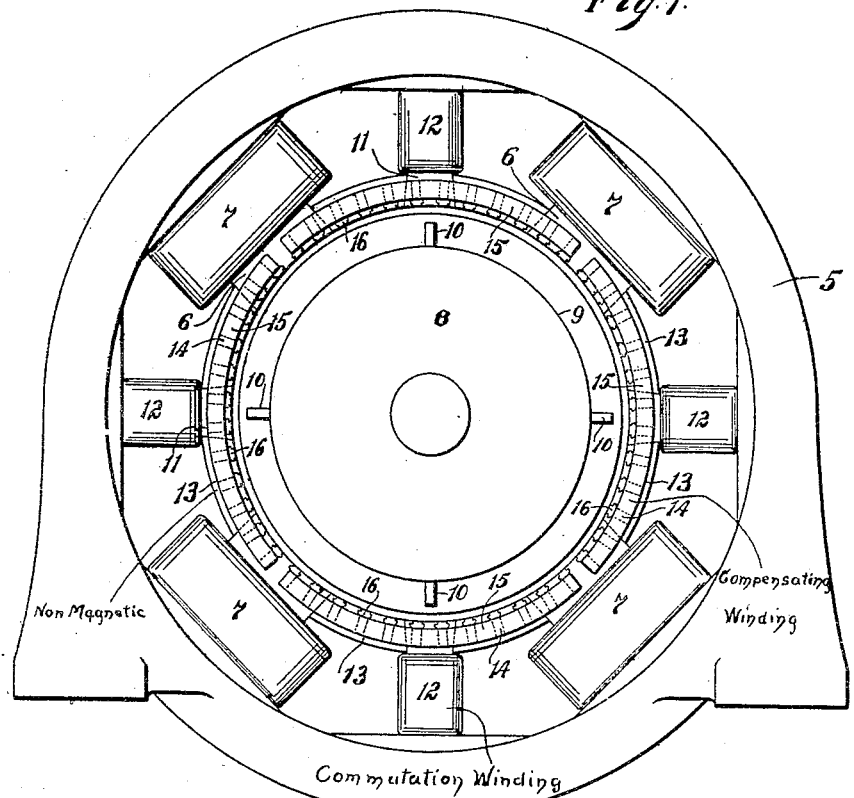
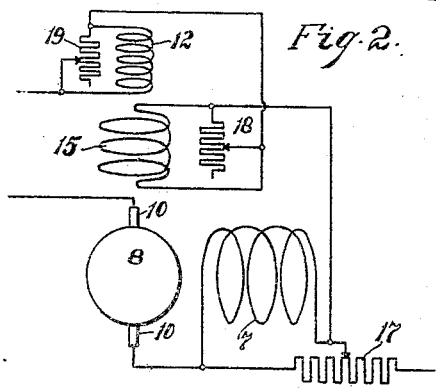
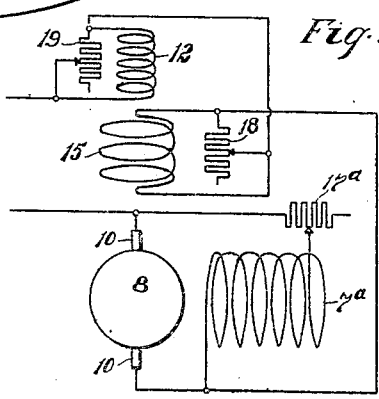
Witnesses:
George J. Schwartz
Fred J. Kinsey
Inventor:
Bernard A. Behrend.
By
Chas. E. Loch
Attorney.

UNITED STATES PATENT OFFICE.

BERNARD ARTHUR BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 922,839.                Specification of Letters Patent.            Patented May 25, 1909.

Application filed June 5, 1905. Serial No. 263,849.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to the construction and operation of dynamo electric machines and particularly to the construction of direct current generators.

As is well known, the output of a given size of direct current generator is practically limited by two factors, the sparking of the commutator and the heat developed during the operation of the machine. The weight and cost of the machine for a given output can be reduced in proportion as these faults are suppressed. The question of heating is readily solved by properly ventilating the machine. The improvement of the commutating qualities, however, presents an entirely different problem, one which has received the careful attention of machine designers for a long time. The primary causes of sparking at the commutator are the production of a distorted main magnetic field by the cross field produced by the current in the armature winding, and also by the reversal of current in the commutated armature coil. To correct the distortion of the main field due to armature reactions it has been suggested to employ a compensating winding, so arranged that the current through same will be substantially equal to and in a direction opposite to the direction of the current in the armature conductors. This alone has not proven entirely satisfactory for sparkless commutation. It has also been suggested to produce a concentrated reverse magnetic field which increases in strength proportionally to the armature load and to commutate the armature coils in this field in order to reduce or entirely neutralize the flow of current in the short-circuited coils of the armature. Several attempts have been made to effect this by placing small series-wound poles between the main poles of the machine and fixing the brushes in line with said small poles. These small auxiliary, or commutation poles, however, have not come into general use for various reasons, one for instance in connection with a shunt wound machine, is that they fail to provide the necessary constancy of field in the commutation zone.

The object of my invention is to produce a direct current generator, (capable of being operated as a motor,) which will operate efficiently and entirely sparklessly. To accomplish this, I provide the machine with an auxiliary commutation winding and a distributed compensating winding and preferably connect the latter winding and the commutation winding in circuit relative to the field and armature windings so that the current strength in said windings may be independently adjusted. The compensating winding is preferably so arranged and the current through same is so adjusted, that the ampere turns of said winding are equal to or slightly greater than the ampere turns of the armature winding. This arrangement gives a complete control of the commutating field and the field for compensating the armature reaction, so that the detrimental effects due to cross fields, armature reactions, and short circuited armature coils may be entirely eliminated and the machine be made to operate sparklessly.

The invention further comprises details of construction of the machine which will be hereinafter described and more specifically stated in the appended claims.

In the accompanying drawings which illustrate the preferred embodiments of my invention, Figure 1 is a side elevation of a machine equipped with a concentrated commutation winding and a uniformly distributed compensating winding; Fig. 2 is a diagrammatic representation of the connections of the various adjustable windings on a series machine; and Fig. 3 is a diagram similar to Fig. 2, illustrating the connections of a shunt machine.

Referring now to Fig. 1, the yoke of the machine is illustrated at 5, the main field pole pieces on said yoke by 6, the main field winding by 7, the armature by 8, and the brushes on the commutator 9 by 10. The auxiliary or commutation pole pieces 11 are mounted in the yoke 5 between the main pole pieces 6 and are provided with the concentrated commutation windings 12, which are connected in the circuit of the machine as will be hereinafter described. The pole pieces 11, constituting the cores of the windings 12, are preferably made of magnetic material, but may, if desired, be made of non-magnetic material. These auxiliary compensating windings produce concentrated reverse magnetic fields in line with the brushes 10 and reduce or entirely neutralize the current flowing in the short circuited armature coils, the current strength through said commutation windings being adjusted as will be explained later. Located between adjacent pole pieces are the bridging members 13 preferably made of non-magnetic material. The pole pieces 6 and 11 and said bridging members 13 are slotted at 14 to receive the coils of the distributed compensating winding 15. This compensating winding may be arranged in any desired manner, depending upon the arrangement of the armature winding, but are preferably so adjusted that their ampere turns equal the ampere turns of the armature winding. The coils of said compensating winding are held in place in said slots by the wedges 16, and are located as near as practicable to the periphery of the armature. The distributed compensating winding is connected in the circuit in such a manner that the current through the coils is in a direction opposite to the direction of the current flowing through the armature conductors, thereby reducing or completely neutralizing the effect of the armature reaction. The combination of concentrated commutation winding and the uniformly distributed compensating winding as herein illustrated and described, aside from the current strength adjusting features, produces a novel result quite different from the result obtained when only one of said spark reducing windings is employed.

In the diagram of connections, Fig. 2, the main field coil 7 is shown as connected in series with the armature 8 and also with the winding 15 for compensating the armature reaction and with the concentrated commutation winding 12. Each of said windings is shunted by an adjustable resistance, the main winding 7 by resistance 17, the winding 15 by resistance 18 and the winding 12 by resistance 19. It will thus be seen that any desired current strength may be obtained in each of said windings, so that just the proper effect may be obtained.

In Fig. 3 the main winding 7ª is connected in shunt to the armature instead of in series therewith, and the adjustable resistance 17ª is connected in circuit with said winding 7ª. The remainder of the circuit connections are the same as shown in Fig. 2.

The compensating and commutation winding may be connected in circuit in a variety of ways, therefore in the appended claims I aim to cover all modifications of my invention which do not depart from its spirit and scope.

Having thus described my invention, what I claim as new and desire to secure by Letters Patent is:—

1. In a dynamo electric machine, an armature winding, a main field winding, a winding for compensating armature reaction, a concentrated commutation winding, the compensating and commutation windings being connected in separate groups, and means for adjusting the current strength in the commutation winding independently of the current strength in the other windings.

2. In a dynamo electric machine, an armature winding, a main field winding, a distributed winding for compensating armature reaction, a concentrated commutation winding, means for adjusting the current flowing through the main field winding, means for adjusting the current flowing through the compensating winding, and means for adjusting the current flowing through the commutation winding.

3. In a dynamo-electric machine, an armature, projecting main field pole-pieces, a main field winding thereon, commutation pole-pieces located between the main pole-pieces, an auxiliary winding on said commutation pole-pieces, and a distributed compensating winding surrounding said armature, said last two windings being connected in separate groups.

4. In a dynamo-electric machine, an armature, projecting main field pole-pieces, a main field winding thereon, commutation pole-pieces located between the main pole-pieces, an auxiliary winding on said commutation pole-pieces, a distributed compensating winding surrounding said armature and partially supported by said pole-pieces, said last two windings being connected in separate groups, and bridging members of non-magnetic material between said pole-pieces for supporting the intermediate portions of said compensating winding.

5. In a dynamo-electric machine, an armature, projecting main field pole-pieces, a main field winding thereon, commutation pole-pieces located between the main pole-pieces, an auxiliary winding on said commutation pole-pieces, a distributed compensating winding surrounding said armature, said last two windings being connected in separate groups, bridging members of non-magnetic material between said pole-pieces, the faces of said pole-pieces and said bridging members being slotted to receive the compensating winding, and means for holding the coils of said winding in position in said slots.

6. In a dynamo electric machine, an armature winding, a main field winding, a distributed winding for compensating armature reaction, and a concentrated commutation winding, said last two windings being connected in separate groups, and means for adjusting the strength of said compensating winding so that its ampere turns will be equal to those of the armature winding.

7. In a dynamo-electric machine, an armature, main pole-pieces, a main field winding thereon, auxiliary pole-pieces, a commutation winding thereon, and a distributed compensating winding in slots in faces of said pole-pieces, said last two windings being connected in separate groups.

8. In a dynamo-electric machine, an armature, main pole-pieces, a main field winding thereon, auxiliary pole-pieces, a commutation winding thereon, a distributed compensating winding in slots in the pole faces, and separate means for adjusting the effect of each of said windings independently.

9. In a dynamo-electric machine, an armature, main pole-pieces, a main field winding thereon, auxiliary pole-pieces, a commutation winding thereon, bridges of non-magnetic material connecting the inner ends of adjacent pole-pieces, and a distributed compensating winding in slots in the pole faces and the bridges, the commutation and compensating windings being connected in separate groups.

10. In a dynamo-electric machine, an armature, main pole-pieces, a main field winding thereon, auxiliary pole-pieces, a commutation winding thereon, bridges of non-magnetic material between adjacent pole-pieces, a distributed compensating winding in slots in the pole faces and the bridges, and separate means for independently adjusting the current strength in each of said windings.

11. In a dynamo-electric machine, an armature, main pole-pieces which project into close proximity to the armature, a main field winding on said pole-pieces, auxiliary pole-pieces located between the main pole-pieces, a commutation winding on said auxiliary pole-pieces, and a distributed compensating winding surrounding said armature, the commutation and compensating windings being connected in separate groups.

12. In a dynamo-electric machine, adjustable means for counteracting the effect of armature reaction, and separate means separately adjustable for reversing the direction of current in the armature coils undergoing commutation.

13. In a dynamo-electric machine of the commutator type, a field structure provided with a compensating and commutating winding, the commutating portions of the winding for the several poles of the machine being connected in a group and the remaining portions of the winding being connected in another group.

14. In a dynamo-electric machine of the commutator type, a field structure provided with a compensating and commutating winding, the commutating portions of the winding for the several poles of the machine being connected in series independently of the rest of the winding, and means for adjusting the relative amounts of current-flow through said commutating portions and the rest of the winding.

15. In a dynamo-electric machine of the commutator type, a field structure provided with a compensating and commutating winding, the commutating portions of the winding for the several poles of the machine being connected in a group and the remaining portions of the winding being connected in another group, and means for varying the relative amounts of current-flow through the two groups.

16. In a dynamo-electric machine of the commutator type, a field structure provided with a compensating and commutating winding, the commutating portions of the winding for the several poles of the machine being connected in a group and the remaining portions of the winding being connected in another group, said groups being connected in series, and a shunting resistance for adjusting the relative amounts of current-flow through said groups.

17. In a dynamo-electric machine of the commutator type, a field provided with a compensating and commutating winding, the commutating portions of the winding for the several poles being connected in a group and the remaining portions of the winding being connected in another group, said groups being connected in series, and independent resistance-shunts for the two groups.

18. In a dynamo-electric machine of the commutator type, a field structure with a compensating and commutating winding, the commutating portions of the winding for the several poles being connected in a group and the remaining portions of the winding being connected in another group, said groups being connected in series, and two adjustable resistances shunting said groups respectively.

19. In a dynamo-electric machine, an armature winding, a main field winding, a winding for compensating armature reaction, a concentrated commutation winding, means for adjusting the current strength in said compensating winding, and separate means for adjusting the current strength in the other windings.

In testimony whereof I affix my signature, in the presence of two witnesses.

BERNARD ARTHUR BEHREND.

Witnesses:
LILLIAN J. BRITTON,
ELIZABETH C. BRITTON.

Corrections in Letters Patent No. 922,839.

It is hereby certified that in Letters Patent No. 922,839, granted May 25, 1909, upon the application of Bernard Arthur Behrend, of Norwood, Ohio, for an improvement in "Dynamo-Electric Machines," errors appear in the printed specification requiring correction, as follows: In line 15, page 1, the word "of" should read *at*, and in line 54, page 2, after the word "main," the word *field* should be inserted; and that the said Letters Patent should be read with these corrections therein that the same may conform to the record of the case in the Patent Office.

Signed and sealed this 22d day of June, A. D., 1909.

[SEAL.]

C. C. BILLINGS,
*Acting Commissioner of Patents.*